Figure 1:
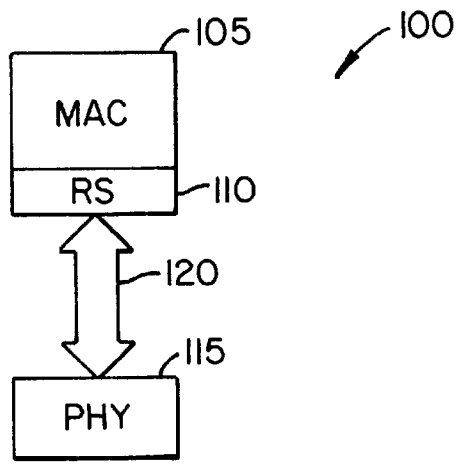
Figure 2:
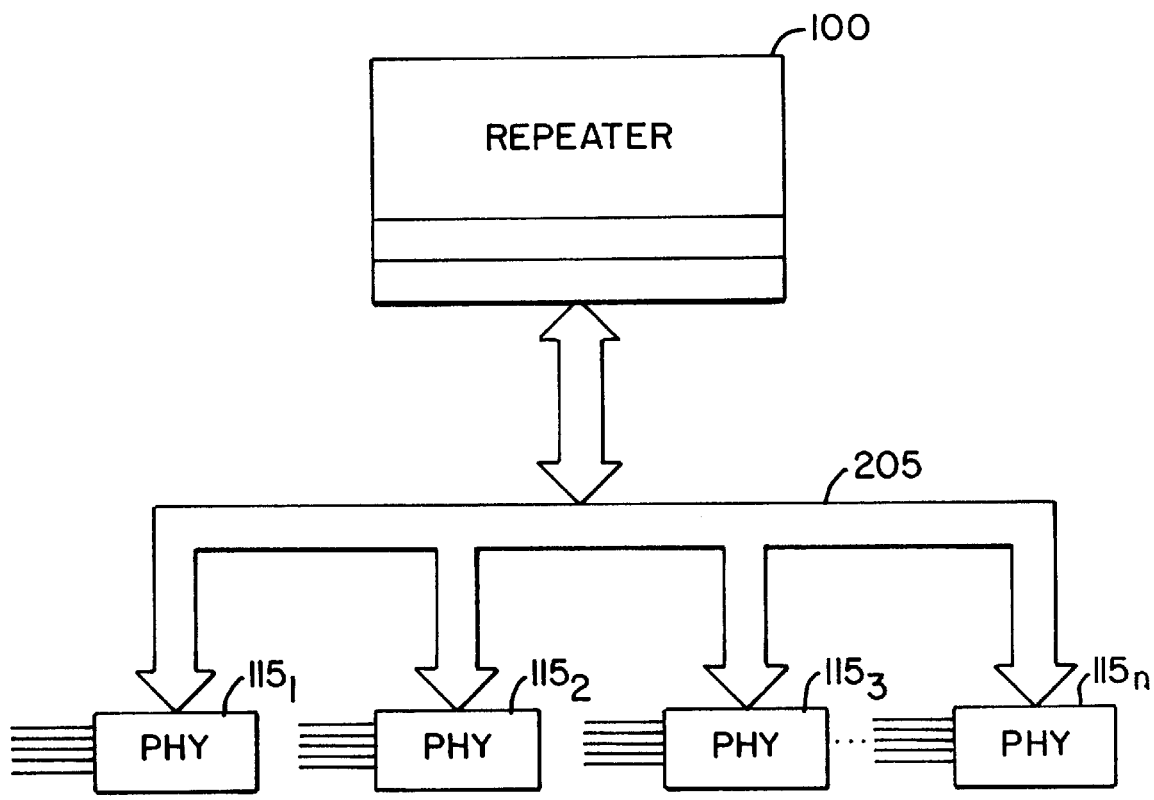
Figure 3:
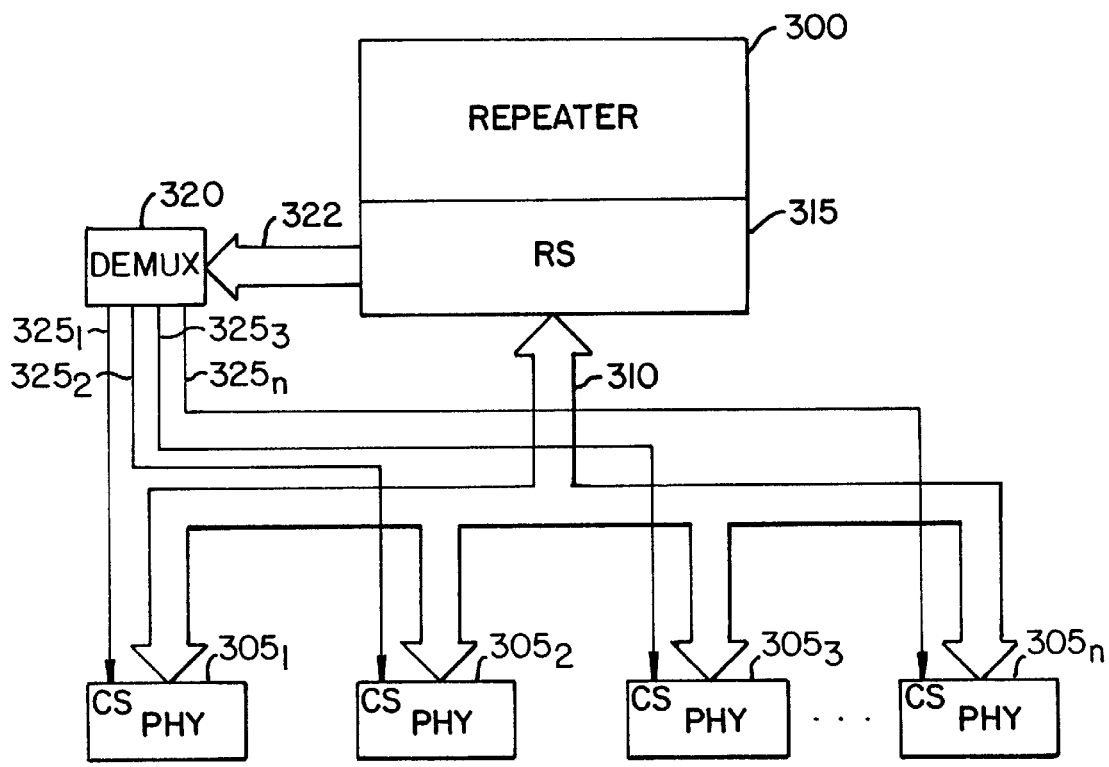

United States Patent [19]
Crayford et al.

[11] Patent Number: 5,978,853
[45] Date of Patent: Nov. 2, 1999

[54] ADDRESS ADMINISTRATION FOR 100BASE-T PHY DEVICES

[75] Inventors: Ian Stephen Crayford, San Jose; Ramesh Sivakolundu, Fremont, both of Calif.

[73] Assignee: Advanced Micro Devices, Inc., Sunnyvale, Calif.

[21] Appl. No.: 08/714,558

[22] Filed: Sep. 16, 1996

[51] Int. Cl.$^6$ ................................................ G06F 15/16
[52] U.S. Cl. .......................................... 709/245; 709/220
[58] Field of Search ........................... 364/200; 395/275, 395/200, 200.57, 200.75, 200.76, 200.8, 200.68, 200.67, 200.5, 200.77; 340/172.5; 709/245, 246, 238, 220, 217, 237, 208

[56] References Cited

U.S. PATENT DOCUMENTS

| | | |
|---|---|---|
| 4,360,870 | 11/1982 | McVey . |
| 4,373,181 | 2/1983 | Chisholm et al. . |
| 5,175,822 | 12/1992 | Dixon et al. ........................... 395/275 |
| 5,608,871 | 3/1997 | Murono ............................. 395/200.02 |
| 5,646,939 | 7/1997 | Lindeborg et al. .................... 370/258 |
| 5,754,540 | 5/1998 | Liu et al. ............................... 370/315 |
| 5,754,552 | 5/1998 | Allmond et al. ........................ 370/465 |
| 5,784,573 | 7/1998 | Szczepanek et al. ................ 395/200.8 |
| 5,790,888 | 8/1998 | Dreyer et al. ........................... 395/825 |
| 5,809,249 | 9/1998 | Julyan ............................... 395/200.53 |
| 5,850,515 | 12/1998 | Lo et al. ............................. 395/183.19 |
| 5,875,210 | 2/1999 | Brief et al. .............................. 375/211 |
| 5,892,926 | 4/1999 | Witkowski et al. ..................... 395/280 |

FOREIGN PATENT DOCUMENTS 0404414  12/1990  European Pat. Off. .

OTHER PUBLICATIONS

IEEE 802.3u Standard IEEE, NY. N.Y. pp. 1–329, 1995.

*Primary Examiner*—Mehmet B. Geckil
*Attorney, Agent, or Firm*—Townsend and Townsend and Crew LLP

[57] ABSTRACT

Dynamic assignation of addresses to multiple PHY devices by a management station coupled to each of the PHY devices permits the management station to uniquely address each PHY device without a priori knowledge of the PHY addresses. The addresses are assigned by the station and thereby knows the addresses to use to access specific PHY devices.

15 Claims, 2 Drawing Sheets

ADDRESS ADMINISTRATION FOR 100BASE-T PHY DEVICES

BACKGROUND OF THE INVENTION

The present invention relates generally to administration of addresses in a network, and more specifically to dynamic assignment of PHY addresses to multiple managed PHY entities that are managed by a station management entity.

FIG. 1 is a block schematic diagram of a conventional implementation of a station management (STA) entity 100 including medium access control (MAC) sublayer 105 and a reconciliation sublayer (RS) 110. STA 100 is coupled to a physical layer interface (PHY) 115 by a media independent interface (MII) 120. STA 100, PHY 115 and MII 120 operate according to parameters defined in IEEE 802.3u standard, hereby expressly incorporated by reference for all purposes. Clause 22 of the incorporated IEEE 802.3u standard describes MII 120 in an implementation that includes an interface that is a simple two wire, serial interface to connect STA 100 to PHY 115 for the purpose of controlling PHY 115 and gathering status information. MII 120 is an eighteen wire connection, with the two wires relevant for the control and gathering being a management data input/output (MDIO) line and a management data clock (MDC) (neither of which are individually shown in FIG. 1).

In some applications, it is desirable to attach one STA 100 to multiple PHY 115 devices. FIG. 2 is a block schematic diagram of a conventional multi-PHY $\mathbf{115}_i$ arrangement. Each PHY 115 device shown in FIG. 2 has an address to facilitate the control and data gathering functions. In a conventional system, the address of any particular PHY $\mathbf{115}_i$ device is set by appropriate grounding of any of five address pins $ADDR_{0-4}$. STA 100 is coupled through a bus 205 to each PHY $\mathbf{115}_i$ device. STA 100 coupled to multiple PHY 115 devices must have a priori knowledge of the address of each PHY 115 if it is to control it and gather information from it. In these conventional systems requiring such a priori knowledge, flexibility, costs and efficiency in setting up and testing these systems are not optimal. It is desirable to find an effective solution to improving operation under these conditions so that effective administration of PHY addresses is possible with the attendant advantage of having efficient multi-phy systems.

SUMMARY OF THE INVENTION

The present invention provides a method for simply, efficiently, economically and dynamically assigning PHY addresses to each of a plurality of PHY devices coupled to a single management entity.

According to one aspect of the invention, it includes a method for assigning a first PHY address to a first PHY and a second PHY address to a second PHY, each PHY coupled to a station, the method including the steps of: asserting a PHY select control signal to the first PHY while the PHY select control signal is not asserted to the second PHY; thereafter transmitting a first management frame to both the first PHY and to the second PHY while the PHY select control signal is asserted to the first PHY and deasserted to the second PHY, the first management frame including a first PHY address field having the first PHY address; thereafter associating the first PHY address with the first PHY; thereafter asserting the PHY select control signal to the second PHY while the PHY select control signal is not asserted to the first PHY; thereafter transmitting a second management frame to both the first PHY and to the second PHY while the PHY select control signal is deasserted to the first PHY and asserted to the second PHY, the second management frame including a second PHY address field having the second PHY address different from the first PHY address; and thereafter associating the second PHY address with the second PHY without changing the first PHY address associated with the first PHY.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 1 is a block schematic diagram of a conventional implementation of a MAC and PHY implementing an embodiment defined in IEEE 802.3u;

FIG. 2 is a block schematic diagram of a conventional multi-PHY arrangement;

FIG. 3 is a block schematic diagram of a preferred embodiment of the present invention; and FIG. 4 is a block schematic diagram of an alternate preferred embodiment of the present invention.

DESCRIPTION OF THE PREFERRED EMBODIMENT

FIG. 3 is a block schematic diagram of a preferred embodiment of the present invention for a station management entity (STA) 300 communicating with a plurality of physical layer devices (PHY) $\mathbf{305}_i$. A media independent interface (MII) 310 couples STA 300 to each PHY 305, a single bus supporting the control and information functions for STA 300. A reconciliation section (RS) 315, part of STA 300, interfaces to MII 310 and includes the management data input/output (MDIO) line and the management data clock (MDC) (neither of which are individually shown in FIG. 3). Note that while the MDIO and MDC pins of the 802.3u defined MII are assumed present in order to interrogate the PHY devices, the full complement of 802.3u defined MII may not be present, nor may an explicit implementation of the RS, as identified in U.S. application, OPTIMIZED MII 802.3u (100 BASE-T) FAST ETHERNET PHYs, filed Sep. 16, 1996.

Additionally, RS 315 provides a selection address to dumultiplexer 320 via a selective address bus 322. Demultiplexer 320 responds to a selection address on selection address bus 322 to assert one of a plurality of chip select signals on a particular one of a plurality of chip select lines $\mathbf{325}_i$. The particular one chip select line $\mathbf{325}_x$ depends upon the selection address, with the selection signal uniquely identifying a particular one PHY $\mathbf{305}_x$. Each PHY 305 includes a chip select (CS) input port that is coupled to one of the plurality of chip select lines 325.

In operation, upon power-up or reset, STA 300 dynamically assigns PHY addresses to PHY devices $\mathbf{305}_i$. STA 300 asserts a first selection address signal to demultiplexer 320. Demultiplexer 320 asserts a first chip selection signal on chip selection line $\mathbf{325}_1$ to a first PHY device $\mathbf{305}_1$. STA 300, using RS 315, transmits an information packet to all PHY devices $\mathbf{305}_i$. This information packet includes a PHY address field containing the address to be assigned to first PHY device $\mathbf{305}_1$. Only first PHY device $\mathbf{305}_1$, the particular one PHY device 305 having the first selection signal asserted at a CS input port, responds to the concurrent assertion of the selection signal and a first specific address in the PHY address field, to store the first specific address in a memory (e.g., buffer or register (not shown)) associated with first PHY device $305_1$. First PHY device $305_1$ thereafter responds to management or control packets addressed using the first specific address.

Subsequently, STA 300 dynamically assigns addresses to the other PHY devices 305 by selectively activating individual ones of the selection signals to PHY devices and by driving an address appropriate for the chip selection signal driven by demultiplexer 320. STA 300 thereby dynamically assigns addresses to all PHY devices 305.

Depending upon particular implementations of STA 300 and PHY devices 305, the actual mechanism of sending the address will vary. In the preferred embodiment of the present invention, MII 310 sends the information, specifically the MDIO line carries the management frame having the PHY address field. STA 300 asserts the CS signal to the particular PHY device 305 to be addressed and then transmits the management frame that conforms to the incorporated IEEE Standard. The proposed IEEE Standard 802.3u provides for a format for a management frame defined in Table I below.

TABLE I

|  | PRE | ST | OP | PHYAD | REGADD | TA | DATA | IDLE |
|---|---|---|---|---|---|---|---|---|
| READ | 1...1 | 01 | 10 | AAAAA | RRRRR | Z0 | D...D | Z |
| WRITE | 1...1 | 01 | 01 | AAAAA | RRRRR | 10 | D...D | Z |

PHYAD is a five bit PHY address that is used to uniquely identify up to thirty-two different PHY devices. In the preferred embodiment, a particular PHY device having a selection signal asserted at its CS input that receives a management frame with a PHY address in the PHYAD field uses the PHY address as its own address. In other applications, other mechanisms using the CS input may be used to dynamically assign the particular PHY with the PHY address. One alternative provides for putting the PHY address in the DATA field, for example.

Figure 4:
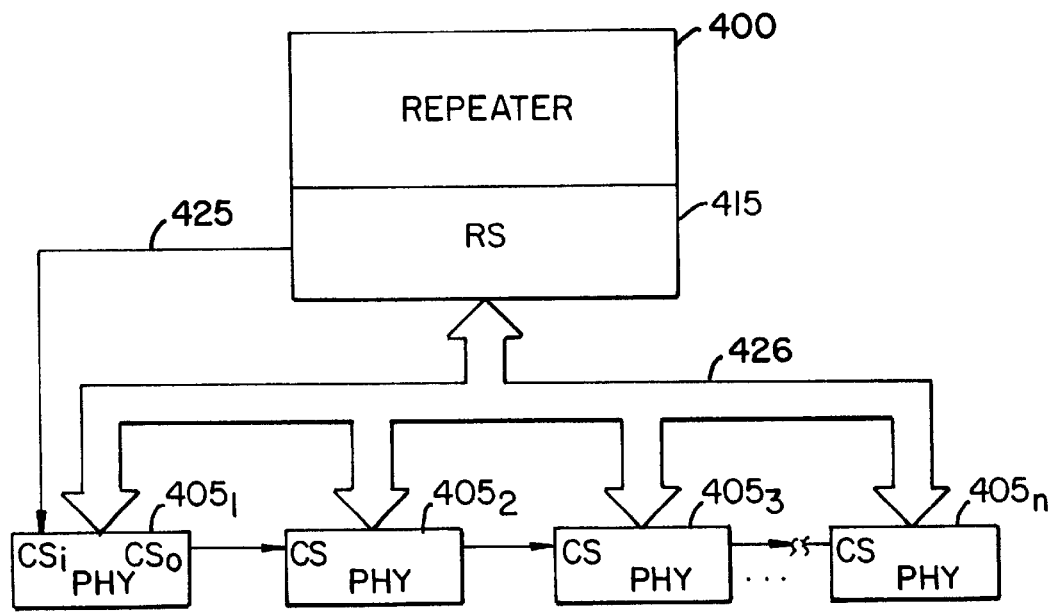

FIG. 4 is a block schematic diagram of an alternate preferred embodiment of the present invention for a STA 400 that dynamically assigns PHY addresses to a plurality of PHY devices $405_i$. STA 400, through RS 415, couples a first chip selection line to a CS input ($CS_i$) of a first PHY device $405_1$. First PHY device $405_1$ also includes a CS output port ($CS_o$). The remainder of the plurality of PHY devices $405_i$ are serially coupled together, with a $CS_o$ of one PHY device $405_k$ being coupled to a $CS_i$ of a subsequent PHY device $405_{k+1}$. In a preferred embodiment, first PHY device $405_1$ is the only PHY device 405 coupled directly to STA 400 via CS line 425. An additional pin acts as a serial extension to the next in series PHY device 405 to produce a daisy chain of PHY devices that are interconnected on the bidirectional MDIO line 426. Each PHY device 405 powers up with an internal connection between its $CS_i$ port and its $CS_o$ port open.

In operation (after power up), STA 400 transmits a special management frame containing a PHY address over MDIO line 415 to only first PHY device $405_1$. First PHY device $405_1$ extracts the PHYAD from the special management frame and uses the PHYAD as its address. Thereafter, first PHY device $405_1$ closes the connection between $CS_i$ and $CS_o$. A second special management frame transmitted from STA 300 to $CS_i$ of first PHY device $405_1$ is ignored by first PHY device $405_1$ and passed to a second PHY device $405_2$ via the serial connection between $CS_o$ of first PHY device $405_1$ and $CS_i$ of second PHY device $405_2$. Second PHY device $405_2$ responds to this second special management frame by extracting the PHYADD from the special management frame and using it as the address for second PHY device $405_2$. Thereafter, second PHY device $405_2$ closes its internal connection between its $CS_i$ and its $CS_o$. A third special management frame then is transmitted by STA 400 through first PHY device $405_1$ and through second PHY device $405_2$ to a third PHY device $405_3$. Third PHY device $405_3$ extracts the PHYADD and assigns the PHYADD as its own address. The procedure continues until all of the plurality of PHY devices have been assigned an address.

In other embodiments, it is possible to address any noise robustness concerns by having a second type of special management frame that reads a programmed PHY address so that the read address can be compared to the desired address before programming another. PHY devices 405 could also be programmed to automatically return the programmed address in response to any special management frame that programs an address.

Still other alternative provides for special management frames (or duplicated special management frames) to explicitly command a particular PHY device 405 to close the connection between its $CS_i$ and $CS_o$ ports. This alternative embodiment helps to ensure that each programmed PHY device 405 has a unique address.

In conclusion, the present invention provides a simple, efficient solution to a problem of dynamically assigning unique addresses to multiple PHY devices connected to a single management master. While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for assigning a first PHY address to a first PHY and a second PHY address to a second PHY, each PHY coupled to a station, the method comprising the steps of:

asserting a PHY select control signal to the first PHY while said PHY select control signal is not asserted to the second PHY; thereafter transmitting a first management frame to both the first PHY and to the second PHY while said PHY select control signal is asserted to said first PHY and deasserted to said second PHY, said first management frame including a first PHY address field having the first PHY address; thereafter associating the first PHY address with the first PHY; thereafter asserting said PHY select control signal to the second PHY while said PHY select control signal is not asserted to the first PHY; thereafter transmitting a second management frame to both the first PHY and to the second PHY while said PHY select control signal is deasserted to said first PHY and asserted to said second PHY, said second management frame including a second PHY address field having the second PHY address different from the first PHY address; and thereafter associating the second PHY address with the second PHY without changing the first PHY address associated with the first PHY.

2. A method for assigning a first PHY address to a first PHY and a second PHY address to a second PHY, the method comprising the steps of:

initializing both the first PHY and the second PHY into a PHY address program mode; thereafter transmitting a first management frame to the first PHY without transmitting said first management frame to the second PHY, said first management frame including a first PHY address field having the first PHY address; thereafter programming the first PHY with the first PHY address; thereafter enabling transmission of subsequent management frames through the first PHY; thereafter transmitting a second management frame to the second PHY through the first PHY, said second management frame including a second PHY address field having the second PHY address; and thereafter programming the second PHY with the second PHY address without changing the first PHY address associated with the first PHY.

3. A method for assigning a PHY address to a PHY, the method comprising the steps of:

initiating the PHY into a programming mode; thereafter transmitting a management frame to the PHY while the PHY is in said programming mode, said management frame including a PHY address field having the PHY address; and thereafter associating the PHY with the PHY address extracted from said management field.

4. The PHY address assigning method of claim 3 wherein said initiating step includes the step of asserting a PHY select control signal to the PHY.

5. The PHY address assigning method of claim 3 wherein said associating step comprises the step of storing the PHY address in a PHY address register coupled to the PHY.

6. The PHY address assigning method of claim 3 wherein said transmitting step comprises the step of:

forming said management frame to be compliant to a standard management frame format having a plurality of management frame fields, said management frame using one of said plurality of management frame fields as said PHY address field.

7. The PHY address assigning method of claim 6 wherein said plurality of frames includes a PHYAD field and said forming step provides the PHY address in said PHYAD field.

8. The PHY address assigning method of claim 6 wherein said plurality of frames includes a DATA field and said forming step provides the PHY address in said DATA field.

9. A method for assigning a PHY address to each PHY of a multi-PHY integrated circuit having at least a first PHY and a second PHY, the method comprising the steps of:

initiating the multi-PHY integrated circuit into a programming mode; thereafter transmitting a management frame to the multi-PHY integrated circuit while the multi-PHY integrated circuit is in said programming mode, said management frame including PHY address information; thereafter determining a first PHY address and a second PHY address from said PHY address information; and thereafter associating the first PHY with said first PHY address; and associating the second PHY with said second PHY address.

10. A method for assigning a first PHY address to a first PHY and a second PHY address to a second PHY, the method comprising the steps of:

transmitting a first management frame to the first PHY while the first PHY is in a PHY address program mode without transmitting said first management frame to the second PHY, said first management frame including a first PHY address field having the first PHY address; thereafter associating the first PHY address extracted from said management frame with the first PHY; thereafter switching the first PHY to an operational mode;

enabling transmission of subsequent management frames to both the first PHY and the second PHY; thereafter transmitting, while the second PHY is in a PHY address program mode, a second management frame to both the first PHY and to the second PHY, said second management frame including a second PHY address field having the second PHY address; thereafter programming the second PHY with the second PHY address without changing the first PHY address associated with the first PHY; and switching the second PHY to an operational mode.

11. The PHY address assigning method of claim 10 wherein said second PHY address transmitting step transmits said second management frame through the first PHY.

12. The PHY address assigning method of claim 11 further comprising the step of verifying, after said first PHY associating step and prior to said enabling step, the first PHY is programmed with the first PHY address.

13. The PHY address assigning method of claim 10 wherein said enabling step is automatically performed upon association of the first PHY address with the first PHY.

14. The PHY address assigning method of claim 12 wherein said enabling step is automatically performed upon verification of the first PHY address with the first PHY.

15. The PHY address assigning method of claim 10 wherein said enabling step is responsive to receipt of a control management frame addressed to the first PHY.

* * * * *